No. 745,966.

Patented December 1, 1903.

UNITED STATES PATENT OFFICE.

FLORENTINE JOSEPH MACHALSKE, OF CHICAGO, ILLINOIS, ASSIGNOR OF ONE-HALF TO CHARLES HERBERT LYON, OF CHICAGO, ILLINOIS.

PROCESS OF PRODUCING SILICON CHLORIDS, HYDROCHLORIC ACID, AND ALKALI HYDROXIDS.

SPECIFICATION forming part of Letters Patent No. 745,966, dated December 1, 1903.

Application filed October 9, 1902. Serial No. 126,427. (No specimens.)

*To all whom it may concern:*

Be it known that I, FLORENTINE JOSEPH MACHALSKE, a citizen of the United States, residing at Chicago, in the county of Cook and State of Illinois, have invented certain new and useful Improvements in Processes of Producing Silicon Chlorids, Hydrochloric Acid, and Alkali Hydroxids, of which the following is specification.

This process relates to the production of chlorids of silicon by heating a charge of materials containing silicon and chlorin—for example, a mixture of silica and an alkali chlorid—to a suitable high temperature, such as may be readily obtained by the use of an electric furnace. The process may be used for producing the different chlorids of silicon by suitably varying the proportions of the ingredients of the charge.

The process further contemplates the utilization of the chlorids of silicon for the production of hydrochloric acid and treatment of the furnace residue for the production of sodium hydroxid.

For the production of silicon tetrachlorid the charge consists of a water-free mixture of one part of silica, preferably in the form of sand, and four parts of an alkali chlorid, preferably sodium chlorid. When this mixture is subjected to a suitably high temperature, which may be best effected by feeding it into an electric furnace, the ingredients of the charge react, giving one part of silicon tetrachlorid, which passes off as a gas, and a residue consisting of two parts of sodium oxid. For the production of silicon dichlorid the charge consists of a water-free mixture of one part of silica and two parts of sodium chlorid or other alkali chlorid. The reaction here results in the production of one part of silicon dichlorid and one part of sodium dioxid. In effecting these reactions in an electric furnace it is undesirable that carbon should be present in any form. I therefore preferably employ an electric furnace in which the electrodes are of metallic silicon instead of carbon.

The temperature most favorable to a complete reaction is that at which silicon volatilizes. An electric current of three hundred amperes at eighty volts is sufficient for a furnace of the usual size.

The chlorids of silicon evolved by these reactions are preferably utilized by bringing them in contact with water.

The reaction between silicon tetrachlorid and water may be expressed by the following formula:

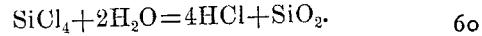
$$SiCl_4 + 2H_2O = 4HCl + SiO_2.$$

The reaction between silicon dichlorid and water is as follows:

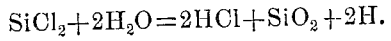
$$SiCl_2 + 2H_2O = 2HCl + SiO_2 + 2H.$$

The silica may be returned to the electric furnace as part of a new charge.

The furnace residue, whether sodium monoxid or dioxid, is preferably treated with water to convert it into sodium hydroxid.

It will be seen that my process affords a cheap and convenient method of splitting an alkali chlorid into the corresponding base and acid, the silica acting merely as as intermediary, which theoretically suffers no loss.

I claim—

1. The process of producing chlorids of silicon, which consists in electrically heating an oxid or salt of silicon and a chlorin compound to a temperature sufficient to cause the materials to react upon each other with the production of a chlorid of silicon, as set forth.

2. The process of producing chlorids of silicon, which consists in electrically heating silica and a chlorin compound to a temperature sufficient to cause the materials to react upon each other with the production of a chlorid of silicon, as set forth.

3. The process of producing chlorids of silicon, which consists of heating a mixture of silica and an alkali chlorid, in suitable proportions, to a temperature sufficient to cause the materials to react upon each other with the production of a chlorid of silicon, as set forth.

4. The process of producing chlorids of silicon, which consists of heating a mixture of silica sand and sodium chlorid, in suitable proportions, to a temperature sufficient to cause the materials to react upon each other with the production of a chlorid of silicon, as set forth.

5. The process of producing chlorids of silicon, which consists of electrically heating a mixture of silica and an alkali chlorid, in suitable proportions, to a temperature sufficient to cause the materials to react upon each other with the production of a chlorid of silicon, as set forth.

6. The process of producing chlorids of silicon, which consists of electrically heating a mixture of silica sand and sodium chlorid, in suitable proportions, to a temperature sufficient to cause the materials to react upon each other with the production of a chlorid of silicon, as set forth.

7. The process of producing chlorids of silicon, which consists of electrically heating a mixture of silica and an alkali chlorid, in suitable proportions, by the use of silicon electrodes, to a temperature sufficient to cause the materials to react upon each other with the production of a chlorid of silicon, as set forth.

8. The process of producing chlorids of silicon, which consists of electrically heating a mixture of silica sand and sodium chlorid, in suitable proportions, by the use of silicon electrodes, to a temperature sufficient to cause the materials to react upon each other with the production of a chlorid of silicon, as set forth.

9. The process of producing silicon tetrachlorid, which consists of heating a mixture of one part of silica and four parts of an alkali chlorid to a temperature sufficient to effect the desired reaction, as set forth.

10. The process of producing hydrochloric acid, which consists of heating a mixture of silica and an alkali chlorid, in suitable proportions, to a temperature sufficient to cause the materials to react upon each other with the production of a chlorid of silicon, and bringing the silicon chlorid into contact with water, as set forth.

11. The process of producing hydrochloric acid, which consists of heating a mixture of silica sand and sodium chlorid, in suitable proportions, to a temperature sufficient to cause the materials to react upon each other with the production of a chlorid of silicon, and bringing the silicon chlorid into contact with water, as set forth.

12. The process of producing hydrochloric acid, which consists of heating a mixture of silica and an alkali chlorid, in suitable proportions, to a temperature sufficient to cause the materials to react upon each other with the production of a chlorid of silicon, bringing the silicon chlorid into contact with water, and employing the residual silica as part of a new charge for the production of silicon chlorid, as set forth.

13. The process of producing hydrochloric acid, which consists of heating a mixture of silica sand and sodium chlorid, in suitable proportions, to a temperature sufficient to cause the materials to react upon each other with the production of a chlorid of silicon, bringing the silicon chlorid into contact with water, and employing the residual silica as part of a new charge for the production of silicon chlorid, as set forth.

14. The process of producing hydrochloric acid and sodium hydroxid, which consists in heating a mixture of silica and an alkali chlorid, in suitable proportions, to a temperature sufficient to cause the materials to react upon each other with the production of a chlorid of silicon, and separately treating the resulting silicon chlorid and alkali oxid with water, as set forth.

In testimony whereof I affix my signature in presence of two witnesses.

FLORENTINE JOSEPH MACHALSKE.

Witnesses:
ARTHUR WM. BARBER,
FRANCIS FORBES.